United States Patent
Kippley et al.

(10) Patent No.: US 9,165,707 B2
(45) Date of Patent: Oct. 20, 2015

(54) MULTIPHASE POWER CONVERTERS HAVING SHARED MAGNETIC CORE SECTIONS

(75) Inventors: Robert H. Kippley, Eagan, MN (US); Bradley J. Schumacher, Savage, MA (US); Andreas Stiedl, Giesshuebl (AT); Kwong Kei Chin, Fremont, CA (US)

(73) Assignee: Astec International Limited, Kwun Tong, Kowloon (HK)

( * ) Notice: Subject to any disclaimer, the term of this patent is extended or adjusted under 35 U.S.C. 154(b) by 1055 days.

(21) Appl. No.: 13/250,780

(22) Filed: Sep. 30, 2011

(65) Prior Publication Data
US 2013/0083575 A1    Apr. 4, 2013

(51) Int. Cl.
*H02M 7/155* (2006.01)
*H01F 27/38* (2006.01)
*H02M 3/28* (2006.01)

(52) U.S. Cl.
CPC .............. *H01F 27/38* (2013.01); *H02M 3/285* (2013.01)

(58) Field of Classification Search
USPC ......... 363/51, 60, 61, 64, 76–82, 90–93, 101, 363/129, 137, 139, 152–156, 170–173
See application file for complete search history.

(56) References Cited

U.S. PATENT DOCUMENTS

| | | | | |
|---|---|---|---|---|
| 4,045,722 A | * | 8/1977 | Tachibana | 363/126 |
| 4,366,532 A | * | 12/1982 | Rosa et al. | 363/69 |
| 4,488,136 A | | 12/1984 | Hansen et al. | |
| 4,513,361 A | * | 4/1985 | Rensink | 363/21.04 |
| 4,631,471 A | * | 12/1986 | Fouad et al. | 323/306 |
| 4,779,181 A | * | 10/1988 | Traver et al. | 363/154 |
| 6,362,986 B1 | | 3/2002 | Schultz et al. | |
| 6,420,953 B1 | | 7/2002 | Dadafshar | |
| 7,352,269 B2 | | 4/2008 | Li et al. | |
| 7,598,839 B1 | | 10/2009 | Wedley | |

OTHER PUBLICATIONS

Sen, et al., A High Efficient Integrated Planar Transformer for Primary-Parallel Isolated Boost Converters, 2010, pp. 4605-4610.

* cited by examiner

*Primary Examiner* — Matthew Nguyen
*Assistant Examiner* — Nusrat Quddus
(74) *Attorney, Agent, or Firm* — Harness, Dickey & Pierce, P.L.C.

(57) ABSTRACT

A multiphase power converter includes a plurality of subconverters and a control circuit. Each subconverter has an input circuit, an output circuit, and a magnetic core coupling the input circuit to the output circuit. The magnetic core of at least one of the plurality of subconverters has a core section that is shared by the magnetic core of another one of the plurality of subconverters. The control circuit is configured to operate the input circuits of the plurality of subconverters with different phases. The magnetic cores may be cores of a transformer, a coupled inductor, etc.

16 Claims, 8 Drawing Sheets

MULTIPHASE POWER CONVERTERS HAVING SHARED MAGNETIC CORE SECTIONS

FIELD

The present disclosure relates to multiphase power converters having shared magnetic core sections.

BACKGROUND

This section provides background information related to the present disclosure which is not necessarily prior art.

Multiphase power converters include two or more switched mode subconverters operated at different phases, usually to increase the overall output power and/or reduce the ripple current and/or voltage at the output. As shown in FIG. 1A, a typical multiphase power converter 100 may include two subconverters 102A, 102B each having a transformer TX1, TX2. FIG. 1B illustrates example magnetic cores 104A, 104B of the transformers TX1, TX2 shown in FIG. 1A. Also illustrated in FIG. 1B is the magnetic flux circulating in each magnetic core 104A, 104B when its associated primary winding is energized.

SUMMARY

This section provides a general summary of the disclosure, and is not a comprehensive disclosure of its full scope or all of its features.

According to one aspect of the present disclosure, a multiphase power converter includes a plurality of subconverters and a control circuit. Each subconverter includes an input circuit, an output circuit, and a magnetic core coupling the input circuit to the output circuit. The magnetic core of at least one of the plurality of subconverters has a core section that is shared by the magnetic core of another one of the plurality of subconverters. The control circuit is configured to operate the input circuits of the plurality of subconverters with different phases.

The magnetic cores of the plurality of subconverters may form an integrated core. Further, the magnetic cores may be transformer cores, coupled inductor cores, etc.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1A:
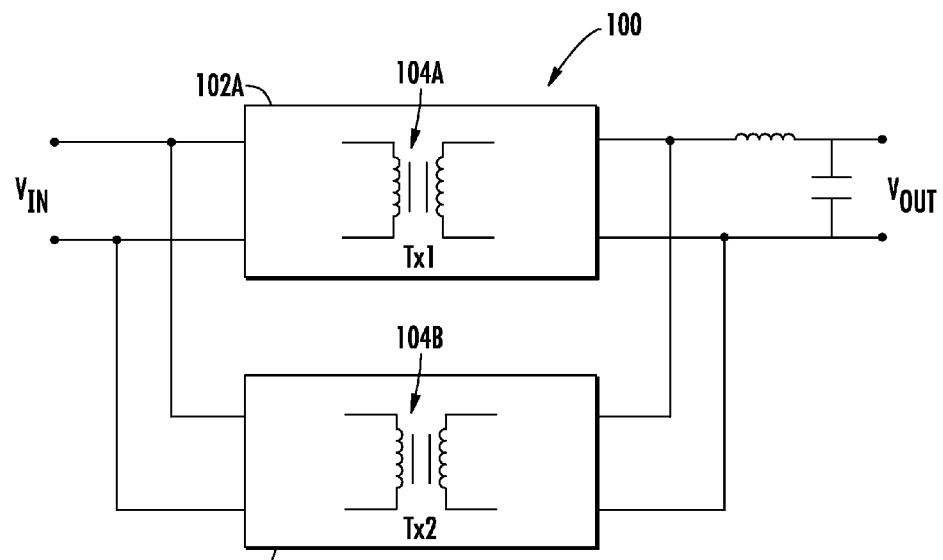
FIG. 1A is a block diagram of an example multiphase power converter having isolation transformers according to the prior art.
Figure 1B:
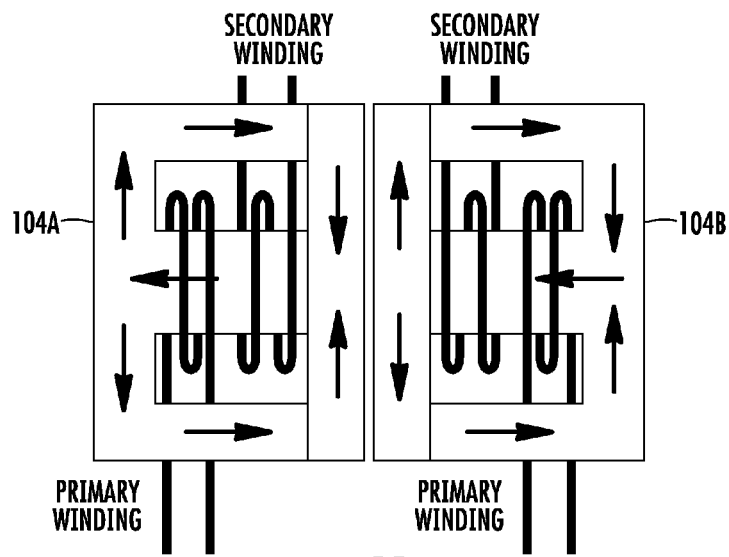
FIG. 1B illustrates the magnetic cores and flux paths of the transformers shown in FIG. 1A.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
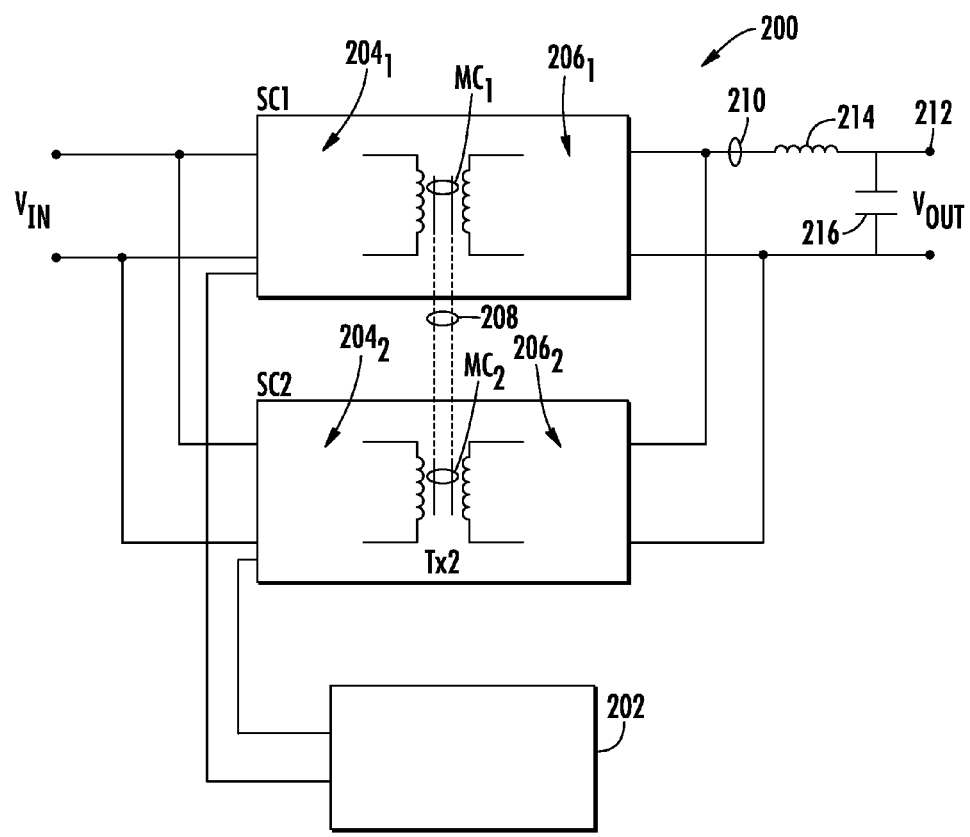
FIG. 2 is a block diagram of an isolated multiphase power converter according to one example embodiment of the present disclosure.

A multiphase power converter according to one example embodiment of the present disclosure is illustrated in FIG. 2 and indicated generally by reference number 200. As shown in FIG. 2, the multiphase power converter 200 includes two switched mode subconverters SC1, SC2 and a control circuit 202. Each subconverter SC1, SC2 has an input circuit $204_1$, $204_2$, an output circuit $206_1$, $206_2$, and a magnetic core $MC_1$, $MC_2$ coupling the input circuit $204_1$, $204_2$ to the output circuit $206_1$, $206_2$. The subconverters SC1, SC2 have a shared core section 208. The control circuit 202 is configured to operate the input circuits $204_1$, $204_2$ of the subconverters SC1, SC2 with different phases (e.g., overlapping and/or nonoverlapping phases). The magnetic cores $MC_1$, $MC_2$ of the subconverters SC1, SC2 form an integrated core. The integrated core may have a monolithic construction. Alternatively, the integrated core can be formed from multiple core sections that are mechanically coupled to one another (e.g., via adhesives or other suitable means). In that case, the multiple core sections may include a combination of, e.g., open looped magnetic cores, such as E cores or U-cores, with I cores in between.

The magnetic cores $MC_1$, $MC_2$ may be transformer cores having primary sides and secondary sides. Accordingly, each input circuit $204_1$, $204_2$ may be a primary side circuit and each output circuit $206_1$, $206_2$ may be a secondary side circuit. Alternatively, each magnetic core $MC_1$, $MC_2$ may be a core of a coupled inductor.

The multiphase power converter 200 further includes an input $V_{IN}$ and an output $V_{OUT}$. The input $V_{IN}$ is coupled to the input circuits $204_1$, $204_2$ and the output $V_{OUT}$ is coupled to the output circuits $206_1$, $206_2$. Alternatively, the input circuits $204_1$, $204_2$ can have separate input terminals. The output $V_{OUT}$ includes an output terminal 212.

Each input circuit $204_1$, $204_2$ may include one or more windings extending about its magnetic core. Additionally, each output circuit $206_1$, $206_2$ may include one or more windings extending about its magnetic core.

In the example embodiment shown in FIG. 2, the output circuits $206_1$, $206_2$ are each coupled to a common terminal 210. The output terminal 212 may be coupled to the common terminal 210 directly, or through one or more circuit elements such as the inductor 214.

The multiphase power converter 200 may additionally include a filter coupled to the output $V_{OUT}$. The filter may include, e.g., the inductor 214 and/or an output capacitor 216. As shown in FIG. 2, the inductor 214 and the output capacitor 216 may be coupled between the common terminal 210 of the output circuits $206_1$, $206_2$ and the output terminal 212. Alternatively, other suitable filters may be employed.

Although only two subconverters are shown in FIG. 2, one or more additional subconverters may be employed. Accordingly, the multiphase power converter 200 may include N subconverters with N−1 shared core sections, where N is an integer greater than or equal to two.

While the control circuit 202 is shown coupled to the input circuit $204_1$, $204_2$ in FIG. 2, it may also be coupled to the output circuits $206_1$, $206_2$ for controlling, e.g., rectifier switches (not shown) in the output circuits $206_1$, $206_2$.

Figure 3A:
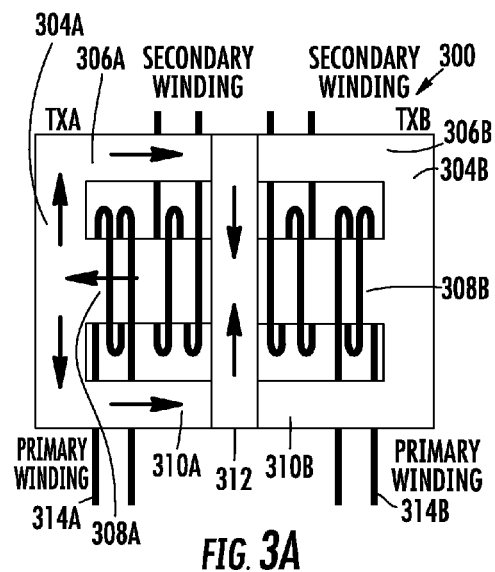
FIGS. 3A and 3B illustrate transformer cores having a shared core section according to another example embodiment of the present disclosure.

The control circuit 202 may include analog and/or digital components. In some embodiments, the control circuit 202 includes one or more digital processors, such as digital signal processors (DSPs), for controlling operation of the input circuits $204_1$, $204_2$ and/or output circuits $206_1$, $206_2$ FIG. 3A illustrates an example embodiment of an integrated core 300 for a first transformer TXA and a second transformer TXB. The first and second transformers TXA, TXB may be employed, for example, in the subconverters SC1, SC2 illustrated in FIG. 2 and described above.

The first transformer TXA has an EI core configuration and the second transformer TXB has an E core configuration. The EI core configuration of transformer TXA includes a shared yoke 312 (i.e., a shared core section 312), a yoke 304A and three legs 306A, 308A, 310A extending from the yoke 304A to the shared yoke 312. The E core configuration of transformer TXB includes a yoke 304B and three legs 306B, 308B, 310B extending from the yoke 304B to the shared yoke 312. The legs 308A, 308B are positioned between legs 306A, 310A and legs 306B, 310B, respectively. Therefore, the legs 308A, 308B can be referred to as interior legs.

As shown in FIG. 3A, the first transformer TXA includes a primary winding 314A extending about the interior leg 308A of the integrated core 300. Similarly, the second transformer TXB includes a primary winding 314B extending about the interior leg 308B of the integrated core 300. Alternatively, the primary windings 314A, 314B may extend about other portions of the integrated core 300. In the example embodiment shown in FIG. 3A, secondary windings for transformers TXA, TXB also extend about the interior legs 308A, 308B, respectively. Further, there are no windings positioned about the shared core section 312.

Figure 3B:
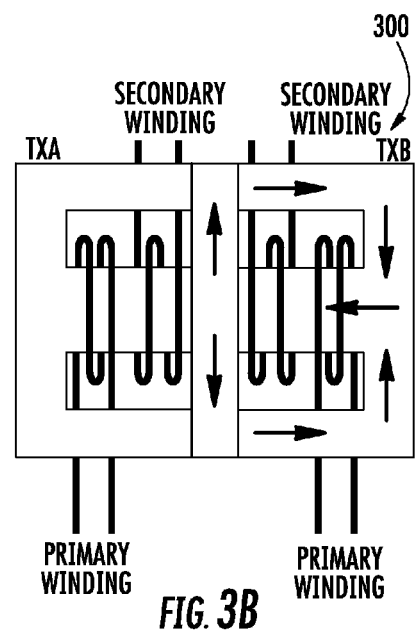

FIG. 3A illustrates the flux (indicated by arrows) circulating in the first transformer TXA when its primary winding 314A is energized. The magnetic flux of the first transformer TXA flows through the interior leg 308A, the legs 306A, 310A and the shared core section 312. Similarly, FIG. 3B illustrates the flux circulating in the second transformer TXB when its primary winding 314B is energized. The magnetic flux of the second transformer TXB flows through the interior leg 308B, the legs 306B, 310B and the shared core section 312. Accordingly, magnetic flux of each transformer TXA, TXB flows through the shared core section 312.

The primary windings 314A, 314B of the transformers TXA, TXB may be energized with nonoverlapping phases. In that case, when the magnetic flux of the first transformer TXA is flowing (i.e., the on time of first transformer TXA), the magnetic flux of second transformer TXB is not flowing. Conversely, when the magnetic flux of the second transformer TXB is flowing (i.e., the on time of second transformer TXB), the magnetic flux of first transformer TXA is not flowing. Accordingly, the first transformer TXA and the second transformer TXB may have a 180 degree phase difference. More generally, each transformer may operate at a phase difference equal to 360/n, where n equals the number of transformers.

Thus, the shared core section 312 of the adjacent transformers TXA, TXB may be time-shared by the magnetic flux switching at different phases. This may reduce the flux density in the integrated core 300, and thus may reduce iron losses. Therefore, the efficiency of the transformers TXA, TXB may increase.

Alternatively, the first transformer TXA and the second transformer TXB may operate with overlapping phases. That is, the on time of the first transformer TXA and the on time of the second transformer TXB may overlap. This may be done by an active control scheme that limits the magnetic flux of each transformer TXA, TXB while the primary windings of both transformers (sharing the common core section) are energized.

Figure 4:
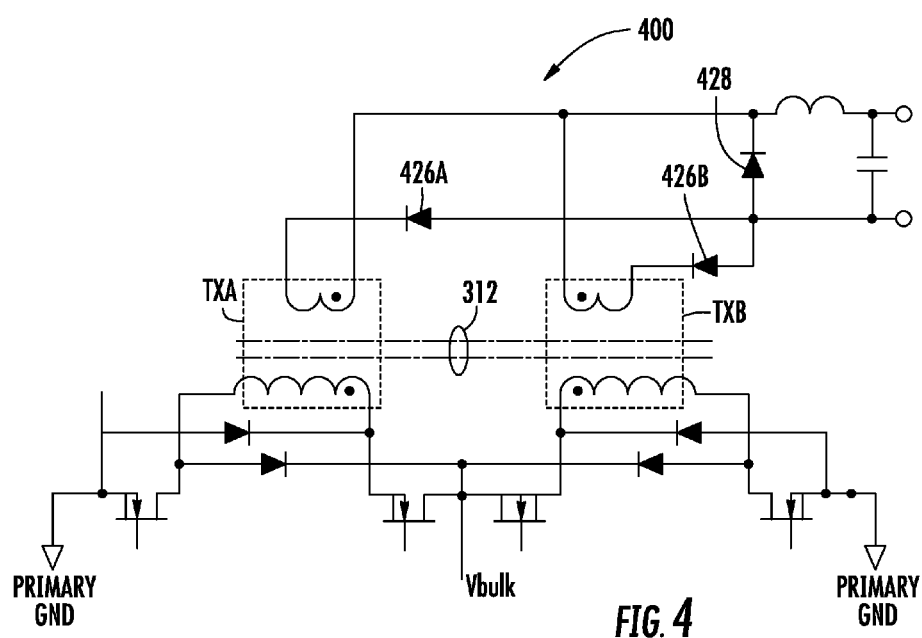
FIG. 4 is a circuit diagram of an isolated multiphase power converter employing the transformer cores of FIGS. 3A and 3B according to another example embodiment of the present disclosure.

FIG. 4 illustrates a schematic of an isolated two-phase interleaved forward converter 400 employing the transformers TXA, TXB having the shared core section 312 of FIGS. 3A and 3B. As shown in FIG. 4, the secondary side circuits each include a rectifier 426A, 426B (e.g., diodes) coupled to the secondary windings of each respective transformer TXA, TXB. It should be understood, however, that other suitable forward converter configurations may be employed, as can other suitable power converter topologies, without departing from the scope of this disclosure.

In one preferred embodiment, the forward converter 400 is a 900 W power converter and each transformer TXA, TXB has a ferrite core of material volume 10.8 cm$^3$. By conjoining the cores, 4 cm$^3$ of ferrite material are shared, resulting in 18.5% of ferrite material reduction. The reduction of material provides savings in both cost and physical size of the cores.

Figure 5:
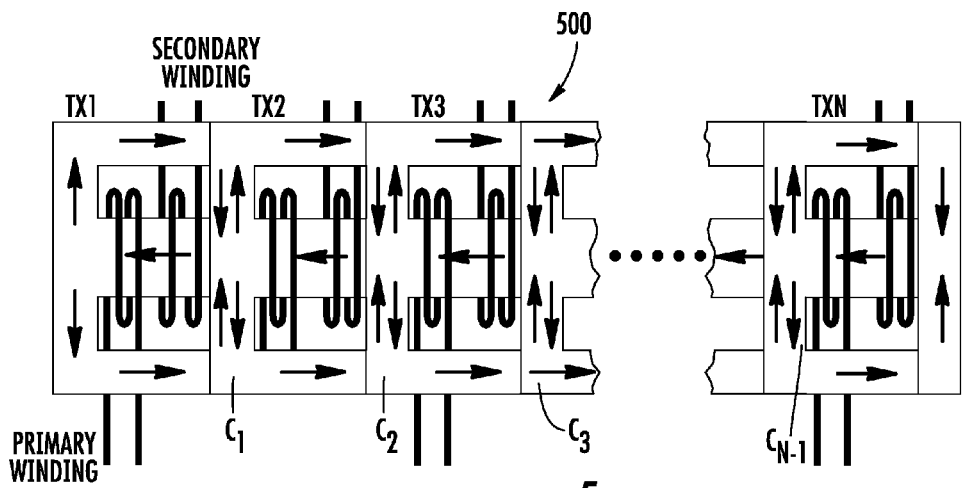
FIG. 5 illustrates multiple transformer cores having multiple shared core sections according to yet another embodiment of the present disclosure.

FIG. 5 illustrates another example embodiment of an integrated core 500 for N transformers $TX_1$-$TX_N$, where N is greater than or equal to two (or least five, in the particular example shown in FIG. 5). The transformers $TX_1$-$TX_N$ may be employed, for example, in the multiphase power converter 200 of FIG. 2. Each transformer has a core section $C_1$-$C_{N-1}$ that is shared with an adjacent transformer. In the example of FIG. 5, the transformers $TX_1$-$TX_{N-1}$ each employ an E core configuration, while the Nth transformer $TX_N$ employs an EI core configuration. Each transformer $TX_1$-$TX_N$ includes one or more primary windings and one or more secondary windings.

Magnetic flux (illustrated by arrows) flows through each transformer's portion of the integrated core, including its shared core section, when the primary winding(s) of that transformer is energized. Although FIG. 5 illustrates flux flowing through all of the transformers $TX_1$-$TX_N$, it should be appreciated that the primary windings of the transformers $TX_1$-$TX_N$ are operated with different phase, which may or may not overlap.

Figure 6:
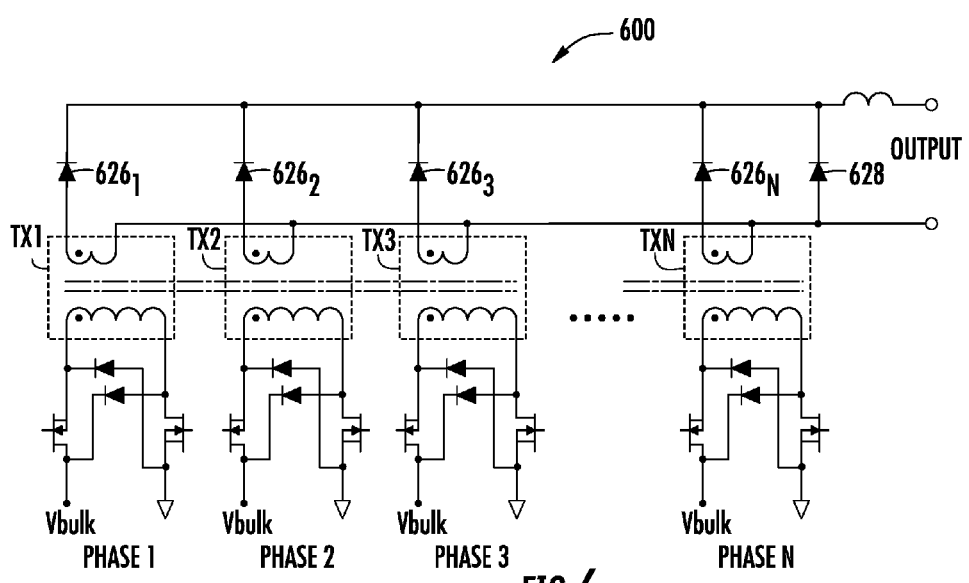
FIG. 6 is a circuit diagram of an isolated multiphase power converter employing the transformer cores of FIG. 5 according to still another example embodiment of the present disclosure.

FIG. 6 illustrates an isolated multiphase forward converter 600 employing the transformers $TX_1$-$TX_N$ having shared core sections $C_1$-$C_{N-1}$ of FIG. 5.

Figure 7A:
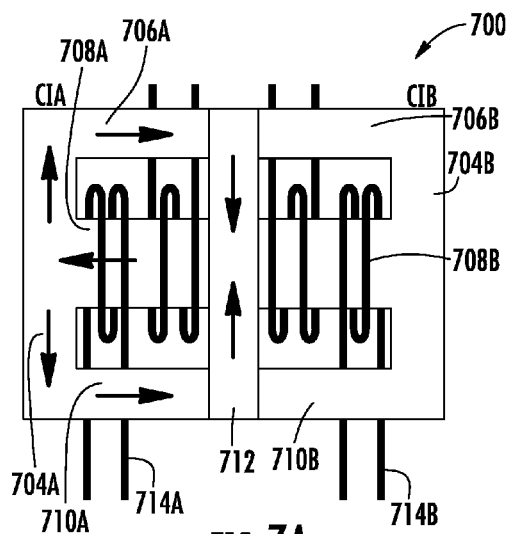
FIGS. 7A-7D illustrate coupled inductor cores having a shared core section according to another embodiment.

FIG. 7A illustrates an example embodiment of an integrated core 700 for a first coupled inductor CIA and a second coupled inductor CIB. The first and second coupled inductors CIA, CIB may be employed, for example, in the subconverters SC1, SC2 illustrated in FIG. 2 and described above.

The first coupled inductor CIA has an EI core configuration and the second coupled inductor CIB has an E core configuration. The EI core configuration of coupled inductor CIA includes a shared yoke 712 (i.e., a shared core section 712), a yoke 704A and three legs 706A, 708A, 710A extending from the yoke 704A to the shared yoke 712. The E core configuration of coupled inductor CIB includes a yoke 704B and three legs 706B, 708B, 710B extending from the yoke 704B to the shared yoke 712. The legs 708A, 708B are positioned between legs 706A, 710A and legs 706B, 710B, respectively. Therefore, the legs 708A, 708B can be referred to as interior legs.

As shown in FIG. 7A, the first coupled inductor CIA includes an input side winding 714A extending about the interior leg 708A of the integrated core 700. Similarly, the second coupled inductor CIB includes an input side winding 714B extending about the interior leg 708B of the integrated core 700. Alternatively, the input side windings 714A, 714B may extend about other portions of the integrated core 700. In the example embodiment shown in FIG. 7A, output side windings for coupled inductors CIA, CIB also extend about the interior legs 708A, 708B, respectively. Further, there are no windings positioned about the shared core section 712.

The integrated core 700 of the coupled inductors CIA, CIB may have the same general configuration as the integrated transformer core 300 shown in FIG. 3A, except the integrated core 700 may include an air gap (not shown) and/or be formed with core material(s) having a higher flux saturation headroom.

Figure 7B:
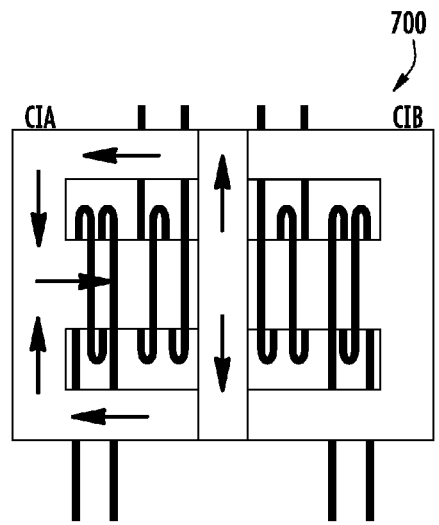
Figure 7C:
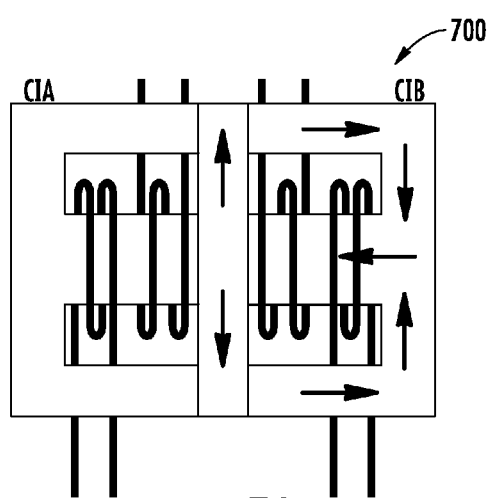
Figure 7D:
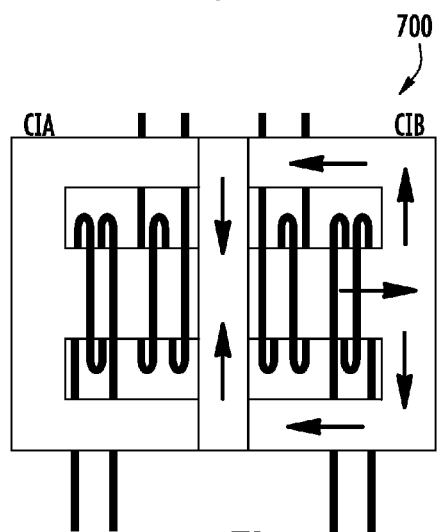

FIG. 7A illustrates the flux (indicated by arrows) circulating in the first coupled inductor CIA when its input side winding 714A is energized (i.e. when the coupled inductor CIA is charging), and FIG. 7B illustrates the flux circulating in the first coupled inductor CIA when its input side winding 714A is not energized (i.e., when the coupled inductor CIA is discharging). In both instances, the magnetic flux of the first coupled inductor CIA flows through the interior leg 708A, the legs 706A, 710A and the shared core section 712. Similarly, FIG. 7C illustrates the flux circulating in the second coupled inductor CIB when its input side winding 714B is energized, and FIG. 7D illustrates the flux circulating in the second coupled inductor CIB when its input side winding 714B is not energized. In both instances, the magnetic flux of the second coupled inductor CIB flows through the interior leg 708B, the legs 706B, 710B and the shared core section 712. Accordingly, magnetic flux of each coupled inductor CIA, CIB flows through the shared core section 312.

The input side windings 714A, 714B of the coupled inductors CIA, CIB are preferably energized with nonoverlapping phases (i.e., such that windings 714A and 714B are not both energized at any given time). Further, winding 714B may not be energized while coupled inductor CIA is discharging and, similarly, winding 714A may not be energized while coupled inductor CIB is discharging. Alternatively, winding 714B can be energized while coupled inductor CIA is still discharging and, similarly, winding 714A can be energized while coupled inductor CIB is still discharging. Accordingly, the first coupled inductor CIA and the second coupled inductor CIB may have a 180 degree phase difference. More generally, each coupled inductor may operate at a phase difference equal to 360/n, where n equals the number of coupled inductors. Further, each winding 714A, 714B may be energized by a drive signal having a duty cycle up to fifty percent (50%).

Thus, the shared core section 712 of the adjacent coupled inductors CIA, CIB may be time-shared by the magnetic flux switching at different phases. This may reduce the flux density in the integrated core 700, and thus may reduce iron losses. Therefore, the efficiency of the coupled inductors CIA, CIB may increase.

Figure 8:
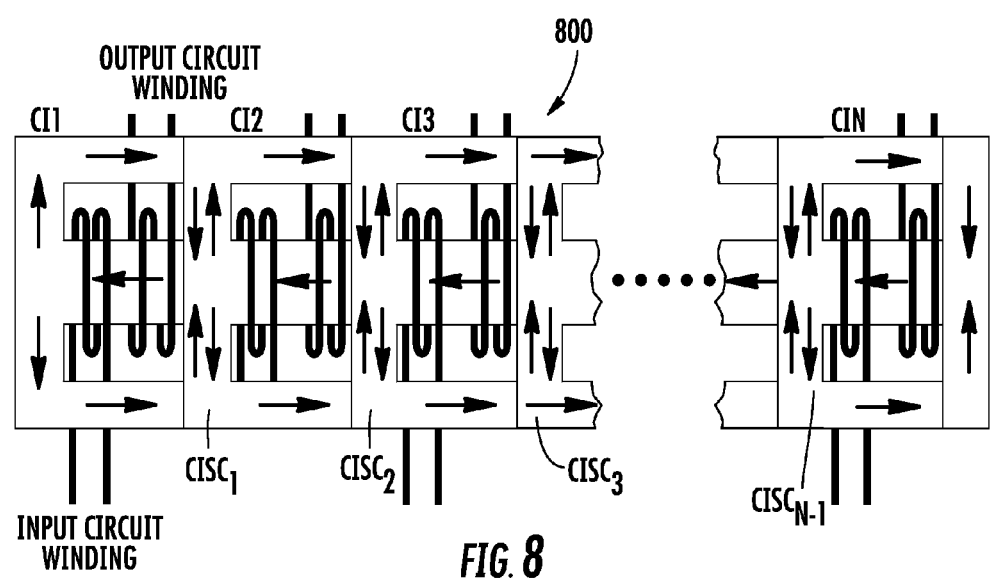
FIG. 8 illustrates multiple coupled inductor cores having multiple shared core sections according to yet another embodiment.

FIG. 8 illustrates another example embodiment of an integrated core 800 for N coupled inductors $CI_1$-$CI_N$, where N is greater than or equal to two (or least five, in the particular example shown in FIG. 8). The coupled inductors $CI_1$-$CI_N$ may be employed, for example, in the multiphase power converter 200 of FIG. 2. Each coupled inductor has a core section $CISC_1$-$CISC_{N-1}$ that is shared with an adjacent coupled inductor. In the example of FIG. 8, the coupled inductors $CI_1$-$CI_N$ each employ an E core configuration, while the Nth coupled inductor $CI_N$ employs an EI core configuration. Each coupled inductor $CI_1$-$CI_N$ includes one or more input side windings and one or more output side windings.

Magnetic flux (illustrated by arrows) flows through each coupled inductor's portion of the integrated core, including its shared core section, when the input side winding(s) of that coupled inductor is charging and discharging. Although FIG. 8 illustrates flux flowing through all of the coupled inductors $CI_1$-$CI_N$, it should be appreciated that the input side windings of the coupled inductors $CI_1$-$CI_N$ are operated with different phase, which may or may not overlap.

Figure 9:
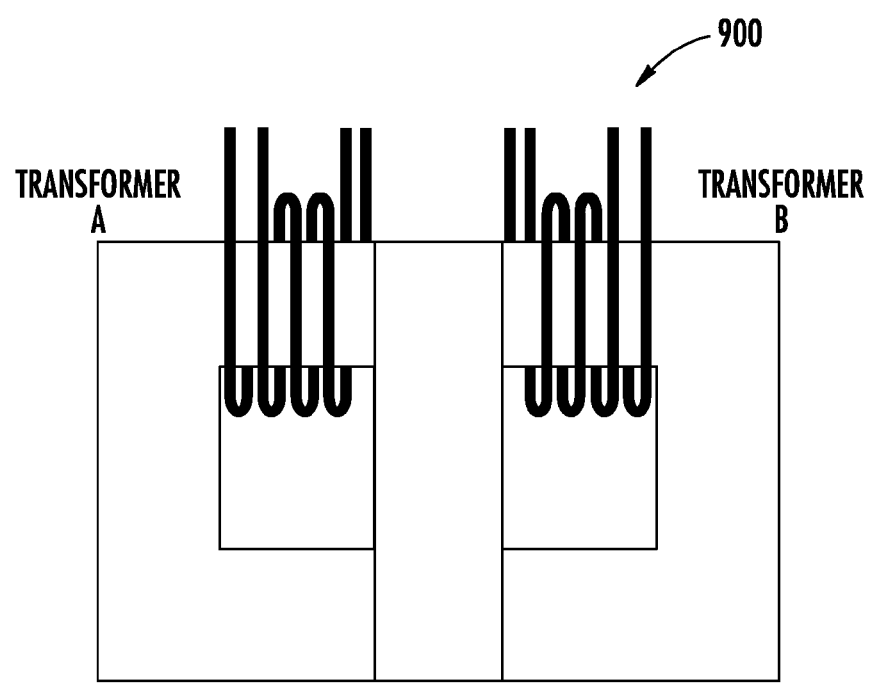
FIG. 9 illustrates an integrated magnetic core formed of U and I core sections including a shared core section according to another example embodiment.

FIG. 9 illustrates another example embodiment of an integrated core 900 for a first transformer A and a second transformer B. The first and second transformers A, B may be employed in the subconverters SC1, SC2 illustrated in FIG. 2 and described above. As shown in FIG. 9, the first transformer A has an UI core configuration and the second transformer B has a U core configuration. The UI core configuration includes a shared core section adjacent the U core configuration. Furthermore, as shown in FIG. 9, each transformer A, B includes primary and secondary windings wound about the core.

Figure 10:
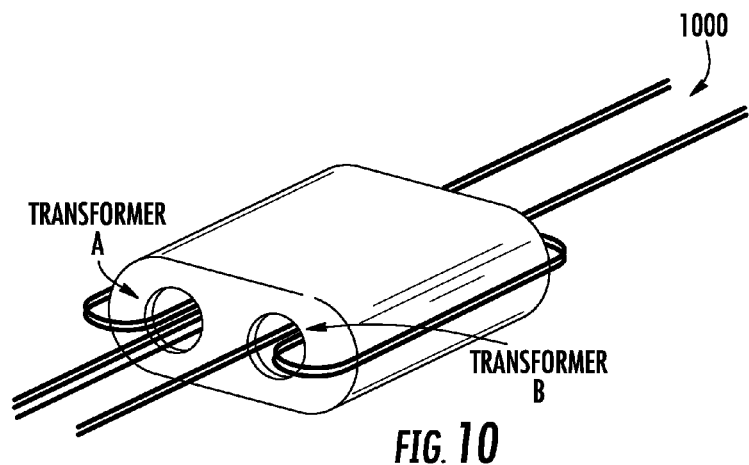
FIG. 10 illustrates a binocular magnetic core having a shared core section according to another embodiment.

FIG. 10 illustrates yet another example embodiment of an integrated core 1000 for a first transformer A and a second transformer B. The first and second transformers A, B may be employed in the subconverters SC1, SC2 illustrated in FIG. 2 and described above. As shown in FIG. 10, the first transformer A and the second transformer B include a binocular core configuration having a shared core section. Furthermore, as shown in FIG. 10, each transformer A, B includes primary and secondary windings wound about the core.

Figure 11:
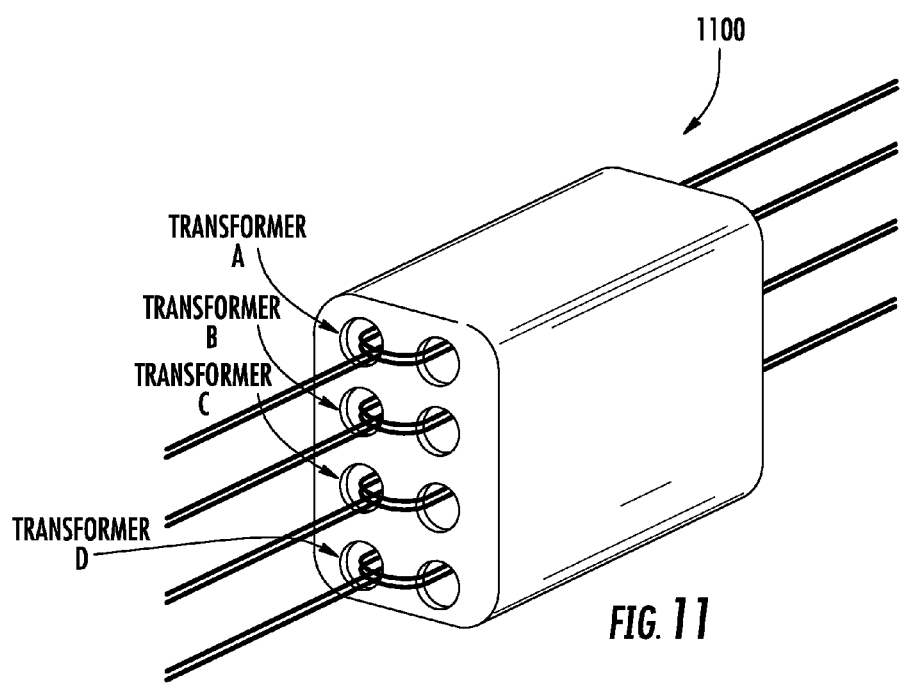
FIG. 11 illustrates a conjoined binocular magnetic core having multiple shared core sections according to yet another embodiment of the present disclosure.

FIG. 11 illustrates still another example embodiment of an integrated core 1100 for four transformers A-D. The transformers A-D may be employed in the multiphase power converter 200 of FIG. 2. As shown in FIG. 11, the transformers A-D include a conjoined binocular core configuration having a shared core section between each adjacent transformer. Furthermore, as shown in FIG. 11, each transformer A-D includes primary and secondary windings wound about the core.

Alternatively, coupled inductors may employ the integrated cores 900, 1000, 1100 of FIGS. 9, 10, 11 respectively. Additionally, the coupled inductors including the integrated cores 900, 1000, 1100 may be employed in the multiphase power converter 200 (e.g., subconverters SC1, SC2) of FIG. 2.

Further, various embodiments of the present disclosure may be employed in any suitable switching power supply, signal switching application, etc. without departing from the scope of this disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A multiphase power converter comprising:
a plurality of subconverters, each subconverter having an input circuit, an output circuit, and a magnetic core coupling the input circuit to the output circuit, the magnetic core of at least one of the plurality of subconverters having a core section that is shared by the magnetic core of another one of the plurality of subconverters; and
a control circuit configured to operate the input circuits of the plurality of subconverters with different phases.

2. The multiphase power converter of claim 1 wherein the magnetic cores of the plurality of subconverters form an integrated core.

3. The multiphase power converter of claim 2 wherein the plurality of subconverters include N converters, and wherein the magnetic cores of the plurality of subconverters include N−1 shared core sections, where N is an integer greater than or equal to two.

4. The multiphase power converter of claim 3 wherein the plurality of magnetic cores include a first magnetic core having an EI core configuration and a second magnetic core having an E core configuration.

5. The multiphase power converter of claim 3 wherein each output circuit includes at least one rectifier.

6. The multiphase power converter of claim 3 wherein each input circuit includes one or more windings extending about its magnetic core.

7. The multiphase power converter of claim 6 wherein the one or more windings of each input circuit extend about an interior leg of its magnetic core.

8. The multiphase power converter of claim 6 wherein there are no windings on the shared core section.

9. The multiphase power converter of claim 3 wherein the output circuits are each coupled to a common terminal.

10. The multiphase power converter of claim 9 further comprising an output terminal coupled to the common terminal.

11. The multiphase power converter of claim 10 further comprising an inductor and/or capacitor coupled between the common terminal and the output terminal.

12. The multiphase power converter of claim 3 wherein the input circuits each employ a forward converter topology.

13. The multiphase power converter of claim 3 wherein each magnetic core is a core of a transformer having a primary side and a secondary side, each input circuit is a primary side circuit and each output circuit is a secondary side circuit.

14. The multiphase power converter of claim 3 wherein each magnetic core is a core of a coupled inductor.

15. The multiphase power converter of claim 3 wherein the different phases are nonoverlapping phases.

16. The multiphase power converter of claim 3 wherein the different phases are overlapping phases.

* * * * *